(12) United States Patent
Sheridan

(10) Patent No.: US 10,794,283 B2
(45) Date of Patent: Oct. 6, 2020

(54) DAMPER CHECK VALVE

(71) Applicant: United Technologies Corporation, Farmington, CT (US)

(72) Inventor: William G. Sheridan, Southington, CT (US)

(73) Assignee: United Technologies Corporation, Farmington, CT (US)

(*) Notice: Subject to any disclaimer, the term of this patent is extended or adjusted under 35 U.S.C. 154(b) by 349 days.

(21) Appl. No.: 15/634,303

(22) Filed: Jun. 27, 2017

(65) Prior Publication Data
US 2018/0371998 A1 Dec. 27, 2018

(51) Int. Cl.
| F01M 1/16 | (2006.01) |
| F02C 7/06 | (2006.01) |
| F01D 25/20 | (2006.01) |
| F16N 7/38 | (2006.01) |
| F15D 1/02 | (2006.01) |
| F16N 7/00 | (2006.01) |
| F01D 15/12 | (2006.01) |

(Continued)

(52) U.S. Cl.
CPC ............... *F02C 7/06* (2013.01); *F01D 15/12* (2013.01); *F01D 25/20* (2013.01); *F01M 1/16* (2013.01); *F02C 3/04* (2013.01); *F02C 9/18* (2013.01); *F02K 3/06* (2013.01); *F15D 1/025* (2013.01); *F16C 32/0644* (2013.01); *F16K 15/00* (2013.01); *F16K 47/00* (2013.01); *F16N 7/00* (2013.01); *F16N 7/385* (2013.01); *F05D 2220/32* (2013.01); *F05D 2240/35* (2013.01); *F05D 2260/60* (2013.01); *F05D 2260/96* (2013.01); *F05D 2260/98* (2013.01); *F16C 2360/23* (2013.01); *F16N 2210/08* (2013.01); *F16N 2210/14* (2013.01); *F16N 2270/60* (2013.01); *F16N 2280/00* (2013.01)

(58) Field of Classification Search
CPC ......... F01D 25/18; F01D 25/20; F01M 11/04; F01M 11/0458; F01M 11/00; F01M 2011/0008; F01M 2011/002; F16C 3/14; F15D 1/02; F02C 7/06
USPC .............................. 138/44; 384/99, 399, 581
See application file for complete search history.

(56) References Cited

U.S. PATENT DOCUMENTS

| 3,013,845 A * | 12/1961 | Loch .................. F16C 32/0622 384/114 |
| 3,686,946 A * | 8/1972 | Halmi ....................... G01F 1/44 73/861.64 |

(Continued)

OTHER PUBLICATIONS

Extended European Search Report for EP Application No. 18179909.8, dated Apr. 25, 2019, 15 pages.

(Continued)

*Primary Examiner* — Carlos A Rivera
*Assistant Examiner* — Alyson Joan Harrington
(74) *Attorney, Agent, or Firm* — Kinney & Lange, P.A.

(57) ABSTRACT

A gas turbine engine includes a fan, a compressor, a combustor, a turbine, a bypass duct, and a bearing compartment assembly. The bearing compartment assembly includes a fluid pump, a compartment, a fluid line between the fluid pump and the compartment, and a damper check valve located in the fluid line. The damper check valve is a unitary, monolithic component that is configured to restrict a reverse flow from the compartment to the fluid pump substantially more than the damper check valve restricts a standard flow from the fluid pump to the compartment.

13 Claims, 2 Drawing Sheets

(51) Int. Cl.
  *F02C 3/04* (2006.01)
  *F02C 9/18* (2006.01)
  *F02K 3/06* (2006.01)
  *F16C 32/06* (2006.01)
  *F16K 15/00* (2006.01)
  *F16K 47/00* (2006.01)

(56) References Cited

U.S. PATENT DOCUMENTS

| | | | | |
|---|---|---|---|---|
| 3,733,902 A * | 5/1973 | Halmi | .................. | G01F 1/44 138/44 |
| 3,894,562 A * | 7/1975 | Moseley, Jr. | ............. | F15D 1/02 138/44 |
| 4,381,128 A * | 4/1983 | Vohr | .................. | F16C 17/03 384/154 |
| 4,621,931 A * | 11/1986 | Jensen | ................. | F16N 27/005 384/114 |
| 4,782,919 A | 11/1988 | Chalaire et al. | | |
| 4,947,639 A | 8/1990 | Hibner et al. | | |
| 5,169,241 A | 12/1992 | Singh | | |
| 5,214,911 A | 6/1993 | Shekleton | | |
| 6,024,129 A * | 2/2000 | Schima | .................. | F04F 5/24 138/44 |
| 9,261,359 B2 * | 2/2016 | DeCool | .................. | G01B 13/00 |
| 9,494,048 B1 * | 11/2016 | Parnin | ................. | F16F 15/0237 |
| 9,605,484 B2 | 3/2017 | Gillis et al. | | |
| 2014/0064930 A1 * | 3/2014 | Nguyenloc | ............. | F01D 15/12 415/122.1 |
| 2016/0333736 A1 * | 11/2016 | Parnin | ................. | F16F 15/0237 |
| 2017/0175874 A1 | 6/2017 | Schwarz et al. | | |

OTHER PUBLICATIONS

European Office Action dated Mar. 30, 2020m received for corresponding European Application No. 18179919.8, 12 pages.

* cited by examiner

DAMPER CHECK VALVE

BACKGROUND

There are a variety of known gas turbine engine configurations, including two-spool, high-bypass engines. Such an engine typically includes a high pressure spool, a combustion system and a low pressure spool disposed within an engine case to form a generally axial, serial flow path about the engine centerline. The high pressure spool includes a high pressure turbine, a high pressure shaft extending axially forward from the high pressure turbine, and a high pressure compressor connected to a forward end of the high pressure shaft. The low pressure spool includes a low pressure turbine, which is disposed downstream of the high pressure turbine, a low pressure shaft, which typically extends coaxially through the high pressure shaft, and a low pressure compressor connected to a forward end of the low pressure shaft, forward of the high pressure compressor. A fan is also connected to the low pressure spool, forward of the low pressure compressor. The combustion system is disposed between the high pressure compressor and the high pressure turbine and receives compressed air from the compressors and fuel provided by a fuel injection system. A combustion process is carried out within the combustion system to produce high energy exhaust gases to produce thrust and turn the high and low pressure turbines, which drive their respective compressors and the fan to sustain the combustion process.

Because there are rotating components within the stationary components of a gas turbine engine, bearings are installed to promote smooth and efficient operation. Traditionally, the bearings are bathed in lubricating oil that is pumped into and scavenged out of the inside of the bearing compartment assembly. The small gap between the rotating components and the stationary components inside of the bearing compartment assembly allow the rotating components to move laterally and radially with respect to one another. Due to vibration from the rotating components, the bearings may be equipped with an oil film damper. During operation, the rotating components can cause a pumping effect on the oil film damper, which generates back pressure in the oil. Depending on the instantaneous, specific location of the rotating components, this back pressure can tend to reverse the flow of oil out of the oil film damper cavity, against the normal flow of oil in the lubrication system.

The loss of oil into the oil film damper reduces its effectiveness, allowing increased vibration in the engine. The back pressure can also cause damage to the lubrication components that fee oil into the oil damper. Traditionally, a mechanical check valve is used to alleviate these conditions, but check valves typically contain moving parts that are subject to wear and have a limited life span.

SUMMARY

According to one embodiment, a gas turbine engine includes a fan, a compressor, a combustor, a turbine, a bypass duct, and a bearing compartment assembly. The bearing compartment assembly includes a fluid pump, a compartment, a fluid line between the fluid pump and the compartment, and a damper check valve located in the fluid line. The damper check valve is a unitary, monolithic component that is configured to restrict a reverse flow from the compartment to the fluid pump substantially more than the damper check valve restricts a standard flow from the fluid pump to the compartment.

According to another embodiment, a bearing compartment assembly includes a fluid pump, a compartment, a fluid line extending between the fluid pump and the compartment, and a damper check valve located in the fluid line. The damper check valve is a unitary, monolithic component that includes a primary convergence, a full-width portion, a reentrant protrusion. The damper check valve is configured to restrict a reverse flow from the compartment to the fluid pump substantially more than the damper check valve restricts a standard flow from the fluid pump to the compartment.

According to another embodiment, a damper check valve is a unitary, monolithic component that includes a converging portion, a diverging portion, and a constriction. The converging portion includes an inlet portion with a straight inner shape and a primary convergence downstream of the inlet portion with a frusto-conical inner shape. The diverging portion is downstream of and adjacent to the converging portion, and the diverging portion includes a full-width portion in contact with an interior of the fluid line and a reentrant protrusion downstream of the full-width portion that has a reduced outer shape. The constriction is located between the converging portion and the diverging portion, and the constriction being a smallest inner diameter of the damper check valve.

DETAILED DESCRIPTION

Figure 1:
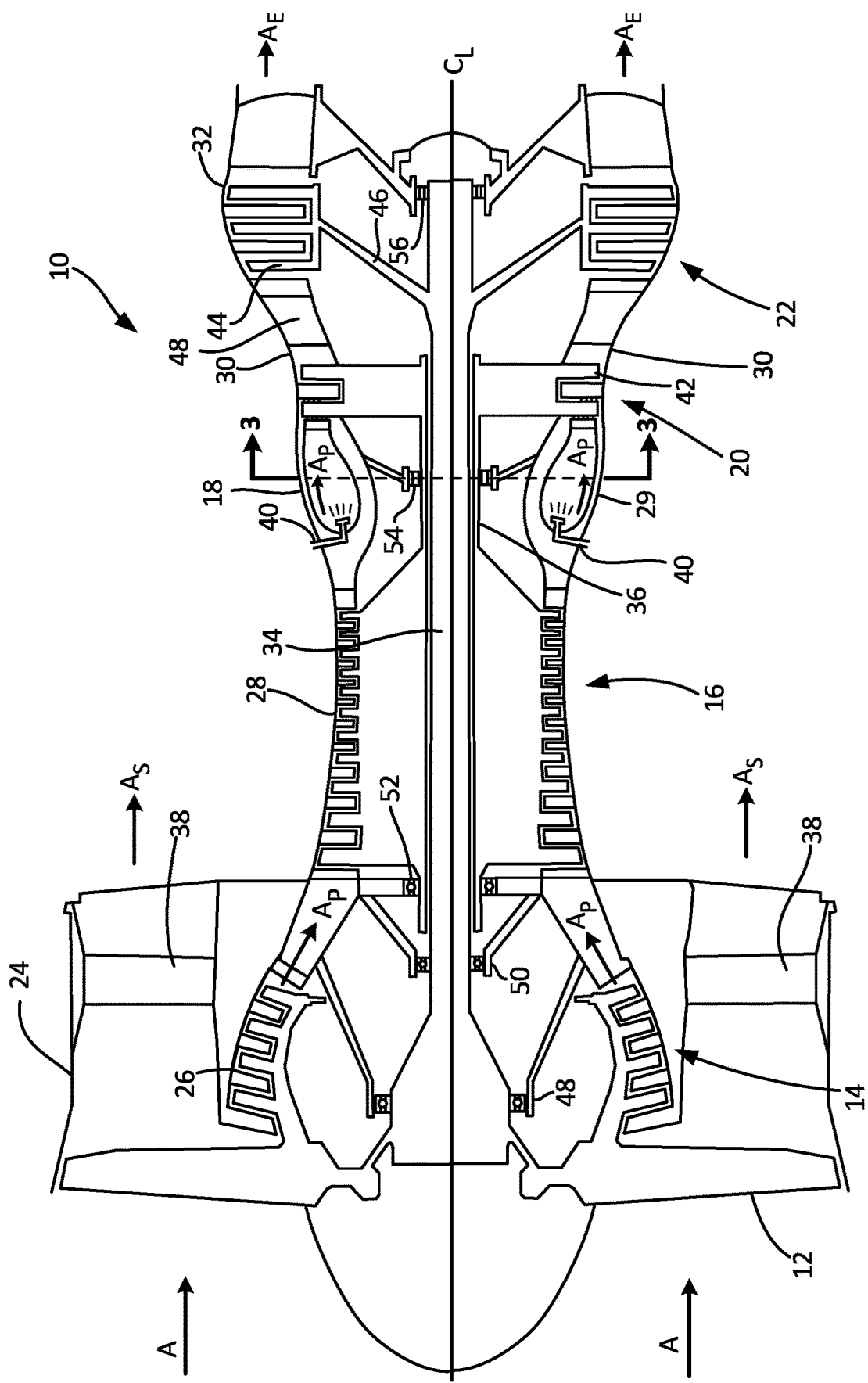
FIG. 1 is a schematic side cross-sectional view of a gas turbine engine.

FIG. 1 is a schematic side cross-sectional view of gas turbine engine 10 for an aircraft (not shown). Shown in FIG. 1 are gas turbine engine 10, fan 12, low pressure compressor (LPC) 14, high pressure compressor (HPC) 16, combustor section 18, high pressure turbine (HPT) 20, low pressure turbine (LPT) 22, fan case 24, LPC case 26, HPC case 28, combustor case 29, HPT case 30, LPT case 32, low pressure shaft 34, high pressure shaft 36, fan exit guide vanes 38, fuel injectors 40, HPT blades 42, LPT blades 44, support rotor 46, first bearing 48, second bearing 50, third bearing 52, fourth bearing 54, fifth bearing 56, inlet air A, exhaust air $A_E$, primary air $A_P$, secondary air $A_S$ (also known as bypass air), and longitudinal engine centerline axis $C_L$.

In the illustrated embodiment, gas turbine engine 10 comprises a dual-spool turbofan engine, although other engine configurations are possible in alternative embodiments. Gas turbine engine 10, of which the operational principles are well known in the art, comprises fan 12, LPC 14, HPC 16, combustor section 18, HPT 20, and LPT 22, which are each concentrically disposed around longitudinal engine centerline axis $C_L$. Fan 12 is enclosed at its outer diameter within fan case 24. Likewise, the other engine components are correspondingly enclosed at their outer diameters within various engine casings, including LPC case 26, HPC case 28, combustor case 29, HPT case 30, and LPT case 32. Fan 12 and LPC 14 are connected to LPT 22 through low pressure shaft 34, and together with fan 12, LPC 14, LPT 22, and low pressure shaft 34 comprise the low pressure spool. HPC 16 is connected to HPT 20 through high pressure shaft 36, and together HPC 16, HPT 20, and high pressure shaft 36 comprise the high pressure spool.

During normal operation, inlet air A enters engine 10 where it is divided into streams of primary air $A_P$ and secondary air $A_S$ after passing through fan 12. Fan 12 is rotated by LPT 22 through low pressure shaft 34 (either directly as shown or through a gearbox, not shown) to accelerate secondary air $A_S$ (also known as bypass air) through fan exit guide vanes 38, thereby producing a major portion of the thrust output of engine 10. Primary air $A_P$ (also known as gas path air) is directed first into LPC 14 and then into HPC 16. LPC 14 and HPC 16 work together to incrementally increase the pressure of primary air A. HPC 16 is rotated by HPT 20 through high pressure shaft 36 to provide primary air $A_P$ to combustor section 18. The compressed air is delivered to combustor section 18, along with fuel through fuel injectors 40, such that this fuel-air mixture is ignited by ignitors (not shown) thus resulting in a combustion process which can be carried out to produce the high energy gases necessary to turn HPT 20 and LPT 22. These high energy gases continue through gas turbine engine 10 whereby they are typically passed through an exhaust nozzle (not shown) to further produce thrust.

After being compressed in LPC 14 and HPC 16 to increase pressure and energy, primary air $A_P$ is mixed with fuel in the combustor section 18. This fuel-air mixture is ignited by ignitors (not shown) and burned in the combustor section 18 producing exhaust air $A_E$. Exhaust air $A_E$ flows through HPT 20 and LPT 22 such that HPT blades 42 and LPT blades 44 extract energy from the flow of exhaust air $A_E$. Exhaust air $A_E$ impinges on HPT blades 42 to cause rotation of high pressure shaft 36, which turns HPC 16. Exhaust air $A_E$ also impinges on LPT blades 44 to cause rotation of support rotor 46 and low pressure shaft 34, which turns fan 12 and LPC 14.

In order to provide stability for and reduce the friction of the rotating components of gas turbine engine 10, several bearings are installed that are positioned between the rotating components and the static components. More specifically, first bearing 48 supports fan 12, second bearing 50 and fifth bearing 56 support low pressure shaft 34, and third bearing 52 and fourth bearing 54 support high pressure shaft 36.

Depicted in FIG. 1 is one embodiment of the present invention, to which there are alternative embodiments. For example, engine 10 can be a three spool engine. In such an embodiment, engine 10 has an intermediate pressure compressor (IPC) between LPC 14 and HPC 16 and an intermediate pressure turbine (IPT) between HPT 20 and LPT 22, wherein the intermediate compressor is connected to the intermediate turbine with an additional intermediate shaft such that low pressure shaft, intermediate shaft and high pressure shaft are each concentrically and coaxially disposed around longitudinal engine centerline axis $C_L$.

Figure 2:
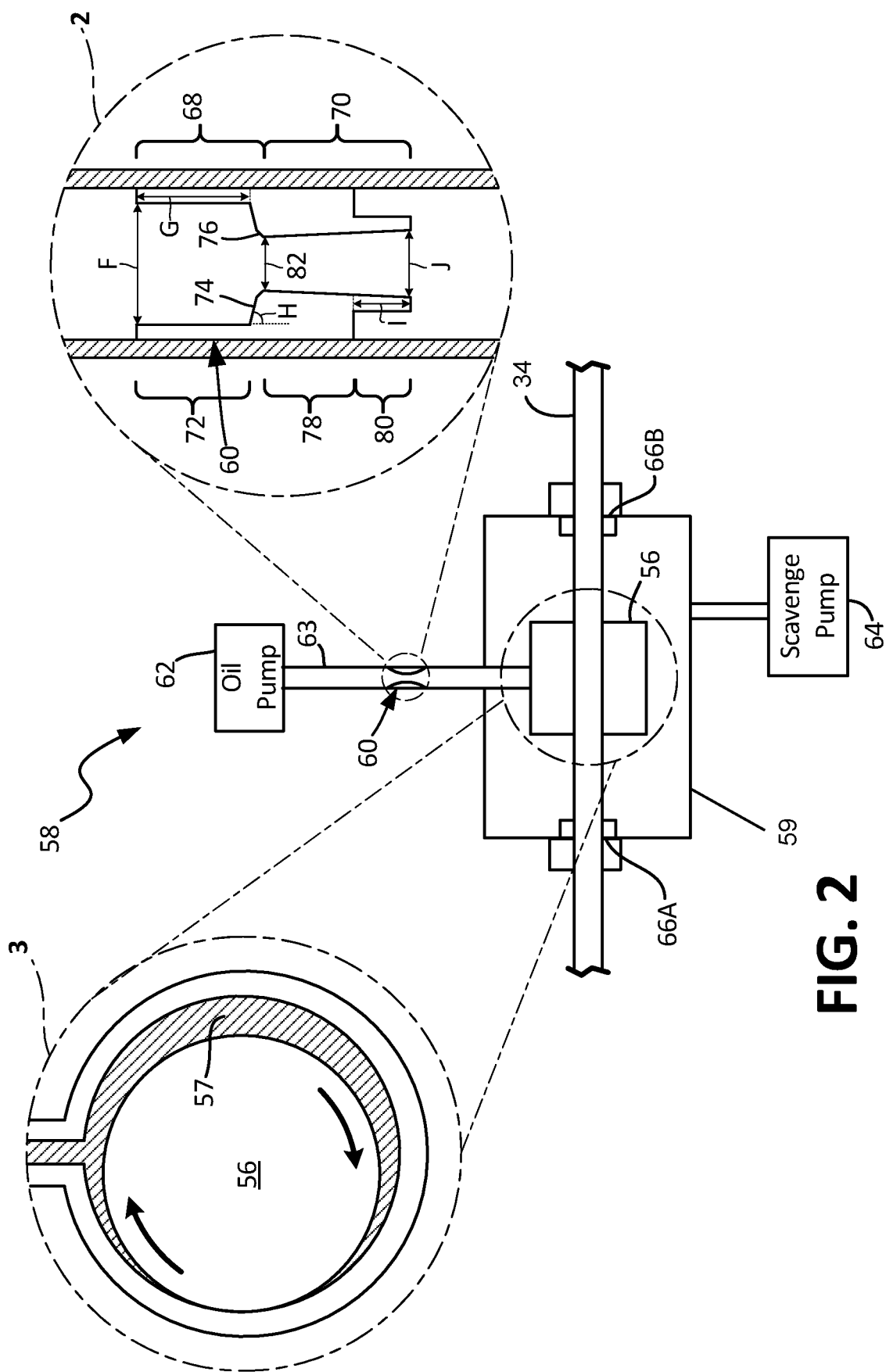
FIG. 2 is a schematic side view of a bearing compartment assembly from the gas turbine engine of FIG. 1, including a close-up view of a damper check valve (see inset 2) and a schematic depiction of the pumping action of a bearing (see inset 3).

FIG. 2 is a schematic side view of bearing compartment assembly 58 from gas turbine engine 10 (shown in FIG. 1), including a close-up side view of damper check valve 60 (see inset 2) and a schematic depiction of the pumping action of bearing 56 (see inset 3). Bearing compartment assembly 58 includes fifth bearing 56 which supports low pressure shaft 34. In alternate an embodiment, bearing compartment assembly 58 can include any one of first bearing 48, second bearing 50, third bearing 52, and fourth bearing 54, each of which support a corresponding rotating component.

In the illustrated embodiment, bearing compartment assembly 58 includes capped compartment 59 that encloses a plenum that surrounds fifth bearing 56, into which pressurized oil is fed from oil pump 62 and drained by scavenge pump 64. Because low pressure shaft 34 passes through bearing compartment assembly 58, bearing compartment assembly 58 includes shaft seals 66A and 66B that are positioned at the exterior of bearing compartment assembly 58 and in contact with low pressure shaft 34.

Inset 3 of FIG. 2 schematically depicts a front cross-sectional view of fifth bearing 56. More specifically, fifth bearing 56 is surrounded by an oil film damper (not shown) that includes oil film 57 that is fed by oil line 63. Such an oil film 57 damps vibration in and from fifth bearing 56, and such effects are known in the prior art (see, for example, U.S. Pat. No. 4,782,919). As fifth bearing 56 whirls within oil film 57, pressure can be developed in the damper oil film 57. Given the direction that fifth bearing 56 is spinning and its location that is shown in inset 3, negative or reverse pressure would be generated. (Positive or standard pressure can also be generated by fifth bearing 56, for example, if its rotation was reversed or its location was moved to the opposite side that is shown to be occupied by the thickest section of oil film 57.)

Therefore, in order to inhibit reverse flow when fifth bearing 56 is generating reverse pressure, damper check valve 60 is located in oil line 63 between oil pump 62 and fifth bearing 56. In the illustrated embodiment, damper check valve 60 is a unitary, monolithic component with no moving parts that generally has an elongated cylindrical shape that butts up against the inner diameter of oil line 63 along a significant length of damper check valve 60. More specifically, damper check valve 60 has converging portion 68 on the upstream side and diverging portion 70 on the downstream side. Converging portion 68 includes inlet portion 72, primary convergence 74 downstream of and adjacent to inlet portion 72, and secondary convergence 76 downstream of and adjacent to primary convergence 74. Diverging portion 70 includes full-width portion 78 and reentrant protrusion 80 downstream of and adjacent to full-width portion 78.

In the illustrated embodiment, inlet portion 72 has a straight inner shape (i.e., a single inlet diameter F) and an inlet length G that is between one and five times the value of inlet diameter F. Primary convergence 74 has a frusto-conical inner shape with an inclination angle H of 85 degrees, although inclination angle H can be from 5 degrees up to 90 degrees. Secondary convergence 76 is substantially smaller than primary convergence 74 and has a frusto-conical inner shape with a forty-five degree angle of inclination (not shown), although secondary convergence 76 can be a radiused section of converging portion 68.

At the junction of converging portion 68 and diverging portion 70 is constriction 82. Constriction 82 is the smallest inner diameter of damper check valve 60. Downstream of and adjacent to constriction 82 is full-width portion 78. Full-width portion 78 has an exterior that contacts the interior of oil line 63 around its entire circumference, blocking flow around damper check valve 60. The interior of full-width portion 78 has a frusto-conical shape that is continued into reentrant protrusion 80. The exterior of reentrant protrusion 80 has a reduced size so that reentrant protrusion 80 is spaced apart from the interior of oil line 63 around its circumference and has a protrusion length I that is one to five times the value of exit diameter J of the interior of reentrant protrusion 80.

During operation of gas turbine engine 10 (shown in FIG. 1), oil generally flows through oil line 63 from oil pump 62 into fifth bearing 56 due to the steady pressure from oil pump 62 (for example, a value of 345 kPa (50 psi) to 3450 kPa (500 psi)). However as indicated previously, temporary pressure conditions can occur in oil film 57 that are greater than the pressure from oil pump 62 (for example, 517 kPa (75 psi) to 5170 kPa (750 psi), for a pressure differential of 172 kPa (75 psi) to 1720 kPa (750 psi)). Such conditions tend to bias oil flow in the reverse direction from fifth bearing 56 to oil pump 62 and the oscillations in oil line 63 from standard flow conditions to reverse flow conditions can occur at a rate of 100 Hz to 500 Hz.

In response, the configuration of damper check valve 60 is such that, for the same pressure differential across damper check valve 60, the mass flow rate of oil is substantially easier in the standard direction than it is in the reverse direction. For example, the mass flow rate of oil can be fifteen or twenty times easier in the standard direction than in the reverse direction. This is due to the Venturi shape (converging-diverging) of the interior of damper check valve 60 as well as the annular gap between the interior of oil line 63 and the exterior of reentrant protrusion 80. In the annular gap, eddy currents during reverse flow causes relatively high pressure losses compared to the relatively low pressure losses during standard flow. Thereby, damper check valve 60 substantially inhibits reverse flow in oil line 63 without the need for moving parts as are present in traditional check valves.

Discussion of Possible Embodiments

The following are non-exclusive descriptions of possible embodiments of the present invention.

A gas turbine engine according to an exemplary embodiment of this disclosure, among other possible things includes: a fan; a compressor downstream of the fan; a combustor downstream of the fan; a turbine downstream of the fan; a bypass duct downstream of the fan and radially outward of the compressor; and a bearing compartment assembly comprising: a fluid pump; a compartment; a fluid line extending between the fluid pump and the compartment; and a damper check valve located in the fluid line, the damper check valve being a unitary, monolithic component that is configured to restrict a reverse flow from the compartment to the fluid pump substantially more than the damper check valve restricts a standard flow from the fluid pump to the compartment.

The gas turbine engine of the preceding paragraph can optionally include, additionally and/or alternatively, any one or more of the following features, configurations and/or additional components:

Wherein the damper check valve is configured to restrict reverse flow at least fifteen times more than the damper check valve is configured to restrict standard flow.

Wherein the damper check valve is configured to restrict reverse flow at least twenty times more than the damper check valve is configured to restrict standard flow.

Wherein the damper check valve is configured to restrict reverse flow twenty times more than the damper check valve is configured to restrict standard flow.

Wherein the fan is driven through a gearbox.

Wherein: the compressor comprises a low pressure compressor rotor and a high pressure compressor rotor; the turbine comprises a high pressure turbine rotor connected to the high pressure compressor rotor by a high shaft and a low pressure turbine rotor connected to the low pressure compressor rotor by a low shaft; and the bearing compartment assembly supports the low shaft.

Wherein the fluid pump is an oil pump and the fluid line is an oil line.

Wherein the damper check valve comprises: a converging portion; a diverging portion downstream of the converging portion; and a constriction between the converging portion and the diverging portion.

Wherein the converging portion comprises: an inlet portion with a straight inner shape; and a primary convergence downstream of the inlet portion with a frusto-conical inner shape.

Wherein the converging portion further comprises a secondary convergence downstream of the primary convergence and upstream of the constriction.

Wherein the diverging portion comprises: a full-width portion in contact with an interior of the fluid line; and a reentrant protrusion downstream of the full-width portion that is spaced apart from the interior of the fluid line.

Wherein the diverging portion comprises: a full-width portion in contact with an interior of the fluid line; and a reentrant protrusion downstream of the full-width portion that is spaced apart from the interior of the fluid line.

A bearing compartment assembly according to an exemplary embodiment of this disclosure, among other possible things includes: a fluid pump; a compartment; a fluid line extending between the fluid pump and the compartment; and a damper check valve located in the fluid line, the damper check valve being a unitary, monolithic component comprising: a primary convergence with a frusto-conical inner shape; a full-width portion downstream of the primary convergence in contact with an interior of the fluid line; and a reentrant protrusion downstream of the full-width portion that is spaced apart from the interior of the fluid line; wherein the damper check valve is configured to restrict a reverse flow from the compartment to the fluid pump substantially more than the damper check valve restricts a standard flow from the fluid pump to the compartment.

The bearing compartment assembly of the preceding paragraph can optionally include, additionally and/or alternatively, any one or more of the following features, configurations and/or additional components:

Wherein the damper check valve further comprises an inlet portion with a straight inner shape upstream of the primary convergence.

Wherein a length of the inlet portion is one to five times as long as an inner diameter of the inlet portion.

Wherein a length of the reentrant protrusion is one to five times as long as an exit diameter of the reentrant protrusion.

A damper check valve that is a unitary, monolithic component according to an exemplary embodiment of this disclosure, among other possible things includes: a converging portion comprising: an inlet portion with a straight inner shape; and a primary convergence downstream of the inlet portion with a frusto-conical inner shape; a diverging portion downstream of and adjacent to the converging portion, the diverging portion comprising: a full-width portion in contact with an interior of the fluid line; and a reentrant protrusion downstream of the full-width portion that has a reduced outer shape; and a constriction between the converging portion and the diverging portion, the constriction being a smallest inner diameter of the damper check valve.

The damper check valve of the preceding paragraph can optionally include, additionally and/or alternatively, any one or more of the following features, configurations and/or additional components:

Wherein the converging portion further comprises a secondary convergence downstream of the primary convergence and upstream of the constriction.

Wherein a length of the inlet portion is one to five times as long as an inner diameter of the inlet portion.

Wherein a length of the reentrant protrusion is one to five times as long as an exit diameter of the reentrant protrusion.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine comprising:
   a fan;
   a compressor downstream of the fan;
   a combustor downstream of the fan;
   a turbine downstream of the fan;
   a bypass duct downstream of the fan and radially outward of the compressor; and
   a bearing compartment assembly comprising:
      a fluid pump;
      a compartment;
      a fluid line extending between the fluid pump and the compartment; and
      a damper check valve located in the fluid line, the damper check valve being
         a unitary, monolithic component that is configured to restrict a reverse flow from the compartment to the fluid pump substantially more than the damper check valve restricts a standard flow from the fluid pump to the compartment, wherein the damper check valve comprises:
         an inlet portion with a straight inner shape comprising a length and a diameter along the length, wherein the length is between one to five times the diameter of the straight inner shape;
         a converging portion downstream of the inlet portion;
         a diverging portion downstream of the converging portion, and a constriction between the converging portion and the diverging portion; wherein
         the diverging portion comprises:
            a full-width portion in contact with an interior of the fluid line; and
            a reentrant protrusion downstream of the full-width portion that is spaced apart from the interior of the fluid line;
            wherein the reentrant protrusion comprises:
               a protrusion length measured from a downstream end of the full-width portion to an exit diameter of the reentrant protrusion, and wherein the protrusion length is less than the length of the inlet portion.

2. The gas turbine engine of claim 1, wherein the damper check valve is configured to restrict reverse flow fifteen times more than the damper check valve is configured to restrict standard flow.

3. The gas turbine engine of claim 1, wherein the damper check valve is configured to restrict reverse flow twenty times more than the damper check valve is configured to restrict standard flow.

4. The gas turbine engine of claim 1, wherein the fan is driven through a gearbox.

5. The gas turbine engine of claim 1, wherein:
   the compressor comprises a low pressure compressor rotor and a high pressure compressor rotor;
   the turbine comprises a high pressure turbine rotor connected to the high pressure compressor rotor by a high shaft and a low pressure turbine rotor connected to the low pressure compressor rotor by a low shaft; and
   the bearing compartment assembly supports the low shaft.

6. The gas turbine engine of claim 1, wherein the fluid pump is an oil pump and the fluid line is an oil line.

7. The gas turbine engine of claim 1, wherein the converging portion comprises:
   a primary convergence downstream of the inlet portion with a frusto-conical inner shape.

8. The gas turbine engine of claim 7, wherein the converging portion further comprises a secondary convergence downstream of the primary convergence and upstream of the constriction.

9. A bearing compartment assembly comprising:
   a fluid pump;
   a compartment;
   a fluid line extending between the fluid pump and the compartment; and
   a damper check valve located in the fluid line, the damper check valve being a unitary, monolithic component that is configured to restrict a reverse flow from the compartment to the fluid pump substantially more than the damper check valve restricts a standard flow from the fluid pump to the compartment, wherein the damper check valve comprises:
      an inlet portion with a straight inner shape comprising a length and a diameter along the length, wherein the length is between one to five times the diameter of the straight inner shape;
      a primary convergence with a frusto-conical inner shape downstream of the inlet portion;
      a diverging portion downstream of the primary convergence; and
      a constriction between the primary convergence and the diverging portion;
      wherein the diverging portion comprises:
         a full-width portion downstream of the primary convergence in contact with an interior of the fluid line; and
         a reentrant protrusion downstream of the full-width portion that is spaced apart from the interior of the fluid line
         wherein the reentrant protrusion comprises:
            a protrusion length measured from a downstream end of the full-width portion to an exit diameter of the reentrant protrusion, and wherein the protrusion length is less than the length of the inlet portion.

10. The damper check valve of claim 9, wherein the protrusion length is one to five times as long as the exit diameter of the reentrant protrusion.

11. A damper check valve that is a unitary, monolithic component comprising:
- an inlet portion with a straight inner shape comprising a length and a diameter along the length, wherein the length is between one to five times the diameter of the straight inner shape; and
- a primary convergence downstream of the inlet portion with a frusto-conical inner shape;
- a diverging portion downstream of the primary convergence, the diverging portion comprising:
  - a full-width portion in contact with an interior of the fluid line; and
  - a reentrant protrusion downstream of the full-width portion that has a reduced outer shape that is spaced apart from the interior of the fluid line, wherein the reentrant protrusion comprises:
    - a protrusion length measured from a downstream end of the full-width portion to an exit diameter of the reentrant protrusion, and wherein the protrusion length is less than the length of the inlet portion; and
- a constriction between the primary convergence and the diverging portion, the constriction being a smallest inner diameter of the damper check valve;
- wherein the damper check valve is configured to restrict a reverse flow from the compartment to the fluid pump substantially more than the damper check valve restricts a standard flow from the fluid pump to the compartment.

12. The damper check valve of claim 11, further comprising a secondary convergence downstream of the primary convergence and upstream of the constriction.

13. The damper check valve of claim 11, wherein the protrusion length is one to five times as long as the exit diameter of the reentrant protrusion.

* * * * *